United States Patent [19]

Najvar

[11] 3,886,107
[45] May 27, 1975

[54] LOW SHRINK WATER EXTENDED VINYL ESTER RESIN EMULSION

[75] Inventor: Daniel J. Najvar, Lake Jackson, Tex.

[73] Assignee: The Dow Chemical Company, Midland, Mich.

[22] Filed: Mar. 21, 1973

[21] Appl. No.: 343,715

[52] U.S. Cl.............260/29.6 WQ, 260/29.6 NR, 260/29.6 RB; 260/20.6 RW; 260/20.6 T; 260/20.6 TA; 260/901
[51] Int. Cl......................... C08f 33/02; C08f 45/24
[58] Field of Search..........260/29.6 NR, 29.6 RB, 260/29.6 RW, 20.6 WB, 20.6 WQ

[56] References Cited
UNITED STATES PATENTS

| 3,367,992 | 2/1968 | Bearden | 260/837 |
| 3,637,546 | 1/1972 | Parker | 260/15 |
| 3,661,827 | 5/1972 | Taft | 260/29.6 MN |
| 3,669,911 | 6/1972 | Najvar | 260/29.6 NR X |
| 3,740,353 | 6/1973 | Patrick et al. | 260/29.6 NR X |

Primary Examiner—Melvin Goldstein
Assistant Examiner—W. C. Danison
Attorney, Agent, or Firm—H. L. Aamoth

[57] ABSTRACT

Control of shrinkage upon curing a water-in-vinyl ester resin emulsion and in dewatering same may be obtained by adding to the emulsion a resin soluble polymer such as an interpolymer of styrene-hydroxypropyl acrylate-methyl methacrylate.

7 Claims, No Drawings

LOW SHRINK WATER EXTENDED VINYL ESTER RESIN EMULSION

BACKGROUND

The object of this invention is to provide dimensional control during the cure of water-in-vinyl ester resin emulsions and in the dewatering of same. By dimensional control is meant control of shrinkage or expansion, usually shrinkage.

Vinyl ester resins are now known to form water-in-resin emulsions without the aid of an emulsifier. To assist in dewatering the cured emulsion without cracking, splitting, etc. U.S. Pat. No. 3,669,911 teaches the use of certain nonionic surfactants in the emulsions. The addition of certain polymers which generally are insoluble in either phase of the emulsion to obtain dimensional control is taught in Ser. No. 88,102 filed on Nov. 9, 1970, now U.S. Pat. No. 3,740,353.

SUMMARY

It has now been discovered that dimensional control may be obtained by adding to a water-in-vinyl ester resin emulsion about 0.5 to 20 weight percent of a polymeric additive which is soluble in the continuous resin phase and which is an interpolymer of about a) 1 to 70 weight percent of a monoalkenyl aromatic monomer, b) 1 to 60 percent of an alkyl acrylate or methacrylate, and c) up to 50 percent of a hydroxyalkyl acrylate or methacrylate provided the combined weight percent of monomers a) and b) is at least about 50 percent. The continuous resin phase of the emulsion comprises a mixture of a terminally unsaturated vinyl ester resin and a copolymerizable monomer.

DESCRIPTION

Application Ser. No. 182,531 filed on Sept. 21, 1971, now U.S. Pat. No. 3,792,006 discloses the preparation of water extended vinyl ester resins, i.e., a water-in-vinyl ester resin, and is incorporated herein by reference. Further disclosure of said emulsions is found in U.S. Pat. No. 3,669,911 which is also incorporated herein by reference.

Said emulsions comprise a discontinuous aqueous phase and a continuous resin phase which, herein is a mixture of a thermosettable vinyl ester resin and an alkenyl aromatic monomer. Up to 25 weight percent of the aromatic monomer may be replaced with a hydroxyalkyl acrylate or methacrylate such as hydroxypropyl acrylate.

The density of the cured emulsion may range from about 15 to 50 lbs/cu. ft. if it is dewatered and from about 40 to 180 lbs/cu. ft. if not dewatered. The densities also vary depending on the resin components and their proportions, whether fillers are used, etc. When dewatering is desired the nonionic surfactants taught in U.S. Pat. No. 3,669,911 may be used.

The amount of the aqueous phase varies from about 20 to 80 weight percent with a preferable upper level of about 60 percent and a preferable lower level of about 40 percent. The balance to make 100 percent comprises the mixture of the vinyl ester resin and monomer as the continuous resin phase. The weight proportions of resin to monomer may vary widely, but usually range from about 80:20 to 30:70, respectively and preferably 70:30 to 50:50.

The emulsions are useful in making cast wall decorations, statuary, etc. and in the dewatered state have many of the characteristics of wood and are useful in making furniture, building panels, cabinet doors and the like. The cured emulsions may be sawed, painted, nailed, stapled, drilled, etc. The emulsions are also useful as soil stabilizers and for surfacing canals, ponds, etc. to prevent loss of liquid by seepage and the like.

To obtain the dimensional control of this invention the resin soluble interpolymer is present in said emulsion in the amounts of about 0.5 to 20 weight percent, preferably 5 to 15 percent. Said resin soluble polymer is an interpolymer of about a) 1 to 70 weight percent of a monoalkenyl aromatic monomer, preferably 50 to 70 percent, b) 1 to 60 percent of an alkyl acrylate or methacrylate, preferably 10 to 60 percent and c) up to 50 percent of a hydroxyalkyl acrylate or methacrylate, preferably 10 to 50 percent, provided the combined weight percent of monomers a) and b) is at least about 50 percent. The monomers employed are well known and typically include styrene, vinyl toluene, $\alpha$-methylstyrene, halogenated styrenes such as the chloro and bromo styrene isomers, alkyl substituted styrenes such as t-butylstyrene, etc.; hydroxyethyl, hydroxypropyl, hydroxybutyl and like esters of acrylic and methacrylic acid where the hydroxy group is usually a 2-hydroxy group group but is not limited thereto; and alkyl esters, which include the cycloalkyl esters, of acrylic and acrylic acid. While any of said monomers may be used the more commonly available hydroxyalkyl and alkyl esters contain 2 to about 6 carbons and 1 to about 12 carbons, respectively.

The resin soluble interpolymer may be prepared by any of the known vinyl polymerization methods, e.g., bulk, solution or emulsion polymerization. Bulk or solution methods are preferred herein. The interpolymers are generally prepared by heating the monomers together in the presence of a free radical catalyst such as a peroxide, a persulfate, a diazo compound, etc.

The emulsions may be made by combining the various components in any convenient order. Usually the interpolymer along with the catalyst (and surfactant is used) is dissolved in the resin phase followed by combination with the water under agitation to form a creamy emulsion. As with any emulsion, stability is dependent on applying sufficient shear in its preparation to form small droplets of the dispersed phase (water, in this instance). Generally, a droplet or particle size of about $10\mu$ or less is preferred. However, stable emulsions with dispersed particle sizes up to $20$–$50\mu$ and even larger may be prepared. A variety of mechanical agitating, stirring or homogenizing devices are well known to the trade for the preparation of such emulsions. The temperature of emulsification can vary widely but is usually between about 30° and 140°F.

Various other materials may also be added such as inert fillers (kaolin clay, silica), glass fibers, mold release agents, surfactants, thickening agents, pigments, etc. Desirably, accelerators or promoters such as dimethyl aniline, dimethyl toluidine, metal naphthenates, etc., are frequently used and should be added last to the emulsion since an accelerated cure may take only a few minutes. small amounts of paraffin wax assist in providing tack free surfaces by concentrating at the surface and excluding air. Vinyl ester resins are prepared by reacting about equivalent quantities of an unsaturated monocarboxylic acid such as methacrylic acid with a polyepoxide resin. With methacrylic acid and a diglycidyl ether of bisphenol A the vinyl ester resin has the formula

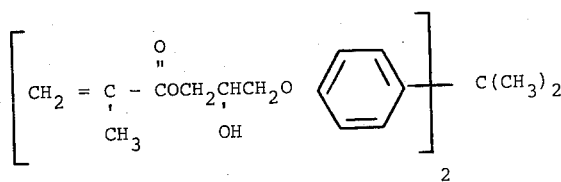

Thus the vinyl ester resin is characterized in having terminal vinylidene groups as opposed to acid or hydroxyl groups found in polyester resins, and also having hydroxyalkyl ester groups generally adjacent the vinylidene group.

Such resins which are herein called vinyl ester resins are described in U.S. Pat. No. 3,367,992 where the unsaturated monocarboxylic acid is an α-hydroxyalkyl acrylate or methacrylate half ester of a dicarboxylic acid; in U.S. Pat. No. 3,006,112; in U.S. Pat. No. 3,179,623; in U.S. Pat. No. 3,256,226 where the molecular weight of the polyepoxide is increased by reaction of same with a dicarboxylic acid; in U.S. Pat. No. 3,301,743; in U.S. Pat. No. 3,377,406 and elsewhere.

As shown in the above references a variety of polyepoxide resins may be used in the preparation of vinyl ester resins. Useful polyepoxides include polyglycidyl ethers of polyhydric phenols and polyhydric alcohols, epoxy novolac resins, epoxidized diolefins or fatty acids or drying oils provided the polyepoxide contains more than one oxirane group per molecule. As previously indicated the polyepoxides also include those wherein the molecular weight is increased by reaction with a difunctional compound such as a dicarboxylic acid.

Preferred polyepoxides are the polyglycidyl ethers of polyhydric phenols and polyhydric alcohols, the epoxy novolac resins and mixtures thereof wherein the epoxide equivalent weight may vary from about 150 up to about 2,000 and even higher.

Unsaturated monocarboxylic acids useful in preparing vinyl ester resins include acrylic acid, methacrylic acid, halogenated acrylic or methacrylic acids, cinnamic acid, and the like and mixtures thereof. Also included are the 2-hydroxyalkyl acrylate or methacrylate half esters of dicarboxylic acids as described in U.S. Pat. No. 3,367,992 wherein the hydroxyalkyl group preferably has from two to six carbon atoms. Typical half esters include the 2-hydroxyethyl acrylate half ester of maleic acid, the 2-hydroxypropyl methacrylate half ester of phthalic acid and the like. Either saturated or unsaturated dicarboxylic acid half esters may be used. Conveniently the half esters are prepared by reacting about 1 mole of said hydroxyalkyl acrylate or methacrylate with 1 mole of a dicarboxylic acid anhydride. Further details may be found in U.S. Pat. No. 3,367,992.

Various catalysts may be used in the preparation of vinyl ester resins. Catalysts include tertiary amines such as tris(dimethylaminomethyl) phenol (known as DMP-30), onium catalysts, triphenyl stibine and triphenyl phosphine, $CrO_3$ and the like. Usually hydroquinone or other like polymerization inhibitors are added to prevent polymerization during the preparation of the resin.

Also included within the definition of vinyl ester resins are those vinyl ester resins which have been further reacted with a reactant such as a dicarboxylic acid anhydride wherein said anhydride reacts with the hydroxyl group formed in the first step reaction of the monocarboxylic acid with the polyepoxide resin (see prior vinyl ester resin formula). The proportions of anhydride may vary from about 0.05 to 0.1 mole up to 1 to 1.2 moles or higher if necessary per mole of hydroxyl group. These modified vinyl ester resins have greatly improved corrosion resistance among other properties and are fully disclosed in U.S. Pat. No. 3,564,074.

Alkenyl aromatic monomers include all the monoalkenyl aromatic monomers previously described and other like monomers. For certain purposes it may be desirable to employ at least in part, a polyalkenyl aromatic monomer such as divinyl benzene and the like. Generally, the preferred monomer is styrene. Up to 25 percent of the aromatic monomer may be replaced by a hydroxyalkyl acrylate or methacrylate monomer.

While the emulsions may be cured by exposing them to ionizing radiation, more frequently it is advantageous to add a free radical generating catalyst, usually to the resin phase before emulsification, and heat to accelerate the cure of the emulsion. A variety of such catalysts are available including peroxides, persulfates, azo catalysts and the like. Benzoyl peroxide, lauroyl peroxide, t-butyl hydroperoxide, t-butyl perbenzoate, methyl ethyl ketone peroxide, potassium persulfate, azobisisobutyronitrile and like catalysts are typical. Normal catalyst levels range from about 0.1 to about 5 weight percent and the emulsion may be cured at temperatures up to about 200°F or even higher. More rapid curing may be obtained by adding effective amounts of accelerating agents such as lead or cobalt naphthenate, N,N-dimethyl aniline and the like.

As disclosed in U.S. Pat. No. 3,669,911 the dewaterability of the cured emulsion may be significantly improved by the addition of a polyethylene oxide-polyalkylene oxide block copolymer nonionic surface active agent wherein the hydrophobic group has a molecular weight of at least about 1,000. Suitable surfactants include those described by I. R. Schmolka, Chapter 10, "Nonionic Surfactants," Vol. 1, edited by M. J. Schick and published by M. Dekker, Inc., N.Y. 1967 and are incorporated herein by reference. Since these surfactants are also fully disclosed in U.S. Pat. No. 3,669,911 no detailed description is considered necessary.

Said surfactant hydrophilic group (i.e., the polyethylene oxide block segment) comprises from about 44 to 90 percent of the weight of the surfactant, varying from about 44 to 55 weight percent for monoinitiated heteric block surfactants to 60 to 90 percent with difunctional initiated all block surfactants. Preferred molecular weight for the former surfactants ranges from about 1,000 to 2,000 while for the latter surfactants the preferred range is about 1,750 to 3,250.

Very small amounts of the nonionic surfactant, as little as 0.005 part per 100 parts of emulsion, are effective. Much larger amounts up to 10 parts or higher may be used but there is no advantage therefrom. Usually about 0.005 to 2 parts is sufficient.

Following cure of the resin emulsion containing the surfactant, the thermoset resin may be dehydrated merely by standing at room temperature. Dehydration is dependent on both temperature and thickness of the resin, for example, a 1 inch thick resin might take about 15 days at 75°F to dehydrate but only takes about 2 to 3 hours at 400°F. Temperatures up to about 450°–500°F may be used if desired. Even at these elevated temperatures the thermoset resins of this invention can be substantially dehydrated without cracking or damage to the resin. Vacuum conditions may also be used in dehydrating the thermoset resin.

The following non-limiting examples will further illustrate the invention. All parts and percentages ar by weight unless otherwise specified.

EXAMPLE 1

A high molecular weight polyepoxide resin was first made by reacting 32.1 parts of an aromatic polyepoxide having an epoxide equivalent weight (EEW) of 186–192 (D.E.R. 331), 4.7 parts of an aliphatic polyepoxide (D.E.R. 732) having an EEW of 305–335 with 3.2 parts of bisphenol A in the presence of t-butylphosphonium acetate catalyst. The reactants were heated with agitation at 150°C. for 1 hour. The temperature was then lowered and 13.5 parts of methacrylic acid added along with a small amount of hydroquinone inhibitor and DMP-30 catalyst. The reactants were then heated at 115°–120°C until the weight percent of acid, as —COOH, reached about 1.2 percent. The resin was cooled to 50°C and 45 parts of styrene monomer added. Then 0.1 part of Tergitol XH surfactant was added (a heteric polyethylene oxide-polyalkylene oxide block copolymer nonionic surfactant) along with 0.2 parts of paraffin wax. The total mixture will be called Resin A hereafter.

An interpolymer was prepared by polymerizing a solution containing 70 parts styrene, 30 parts hydroxypropyl acrylate (HPA), 10 parts methyl methacrylate and 1 part benzoyl peroxide at 140°–150°C. The resulting terpolymer was dissolved in styrene (50 percent) and cooled.

A water-in-resin emulsion was prepared by mixing 14 lbs. of Resin A with 69 grams of benzoyl peroxide, 140 grams of styrene and 1390 grams of said terpolymer solution. A clear liquid solution was obtained to which 20.3 lbs. of water was slowly added with agitation. A smooth, white emulsion was prepared.

The emulsion was divided into six smaller portions and poured into cabinet door molds, 12 × 16 × ⅝ inches. N,N-dimethyl-p-toluidine (0.2 percent) was added to accelerate the room temperature cure of the emulsion. Each of the parts were demolded in about 10 minutes and placed in a 390°–410°F forced draft oven for about 1.5 hours. After cooling the parts were determined to have lost 50.6–55.6 percent of their weight. The linear shrinkage for each of the parts was a true zero percent.

Using the same resin without the interpolymer, the emulsion shrunk 3.44 percent when cured and dried as above. Essentially the same results were found when the terpolymer content of the emulsion was increased from about 4 percent, above, to 9.9 percent. (The water content was kept constant at 55 percent.)

EXAMPLE 2

A series of emulsions at a 50 percent water content were prepared similar to Example 1. The weight percent terpolymer was varied and the linear shrinkage after dehydration was determined.

|   | Wt. % Terpolymer | % Linear Shrinkage |
|---|---|---|
| A | 4.6 | −1.0 |
| B | 8.4 | +0.3 |
| C | 10.0 | 0 |
| D | 11.6 | +2.0 |
| E | 14.4 | +2.3 |

EXAMPLE 3

Teste similar to Example 2 were made except that the emulsions were cured at 98°–102°F rather than at room temperature.

|   | Wt. % Terpolymer | % Linear Shrinkage |
|---|---|---|
| F | 7.2 | −1.2 |
| G | 8.4 | −1.0 |
| H | 11.6 | +0.5 |
| I | 12.6 | +0.3 |
| J | 13.4 | +0.8 |

EXAMPLE 4

Similar results as above were obtained using a different preparative method. The interpolymer was first prepared in the presence of the polyepoxide resin used to form the vinyl ester resin. The polyepoxide resin (D.E.R. 331) was charged to a two liter resin kettle and heated to 130°C under agitation. A solution containing 60 percent styrene, 40 percent isobutyl acrylate and 1 percent benzoyl peroxide was added incrementally over a 1–2 hour period and then heated to 150°C to deactivate the peroxide.

After cooling to about 110°C a stoichiometric amount of methacrylic acid to react with the epoxide groups was added. Reaction was continued until the acid content had dropped to about 1 percent. Then about 45 percent styrene was added and the resin cooled. The tergitol surfactant was then added. A clear resin containing 10 percent interpolymer was prepared. An emulsion was then prepared similar to Example 1, cured and dehydrated with zero shrinkage.

What is claimed is:

1. A water-in-resin emulsion comprising about 20 to 80 percent of a dispersed aqueous phase, about 80 to 20 weight percent of a continuous resin phase wherein the continuous resin phase is a mixture of a terminally unsaturated vinyl ester resin and a copolymerizable alkenyl aromatic monomer in the respective weight proportions of about 80:20 to 30:70 and about 0.5 to 20 weight percent of a dimensional control agent which is soluble in the resin phase and consists of an interpolymer of a) 1 to 70 weight percent of a monoalkenyl aromatic monomer, b) 1 to 60 percent of an alkyl acrylate or methacrylate, and c) up to 50 percent of a hydroxyalkyl acrylate or methacrylate provided the combined weight of monomers a) and b) is at least 50 percent; and wherein said vinyl ester resin is a reaction product of about equivalent amounts of an unsaturated monocarboxylic acid and a polyepoxide.

2. The emulsion of claim 1 wherein the amount of said control agent is about 5 to 20 percent.

3. The emulsion of claim 1 wherein the copolymerizable monomer of the resin phase is styrene.

4. The emulsion of claim 1 wherein said control agent is an interpolymer of styrene, hydroxypropyl acrylate and methyl methacrylate.

5. The emulsion of claim 1 wherein said control agent is a copolymer of styrene and isobutyl acrylate.

6. The emulsion of claim 1 wherein said resin phase contains a nonionic polyethylene oxide-polyalkylene oxide block copolymer surfactant.

7. The emulsion of claim 1 wherein the control agent is an interpolymer of 50 to 70 percent of the aromatic monomer, 10 to 60 percent of the alkyl ester and 10 to 50 percent of the hydroxyalkyl ester.

* * * * *